US005390075A

United States Patent [19]
English et al.

[11] Patent Number: 5,390,075
[45] Date of Patent: Feb. 14, 1995

[54] ELECTRONIC APPARATUS WITH FLEXIBLE CABLE INTERCONNECT HAVING INDEPENDENTLY MOVABLE MEMBER SUPPORTED ON TAB PORTIONS

[75] Inventors: John J. English, Hallstead, Pa.; Robert D. Loy, Whitney Point, N.Y.; Oswaldo A. Mantilla, Endicott, N.Y.; Walter Melnychenko, Johnson City, N.Y.; Roger J. Stockholm, Montrose, Pa.

[73] Assignee: International Business Machines Corporation, Armonk, N.Y.

[21] Appl. No.: 285,365

[22] Filed: Aug. 3, 1994

Related U.S. Application Data

[63] Continuation of Ser. No. 441, Jan. 4, 1993.

[51] Int. Cl.6 .................... H05K 7/16; H01R 3/00; H01B 7/24; G06F 1/16
[52] U.S. Cl. ............................ 361/683; 361/679; 361/681; 16/386; 439/165; 174/136
[58] Field of Search ............... 16/223, 374, 377, 386; 439/31, 164, 165; 248/917–923; 364/708.1; 174/1, 65 R, 81, 86, 135, 136, 151; 361/679–686, 724–727, 749–751, 789, 796, 803

[56] References Cited

U.S. PATENT DOCUMENTS

| | | | |
|---|---|---|---|
| 4,842,531 | 6/1989 | Takemura | 439/165 |
| 4,885,430 | 12/1989 | Kinser, Jr. et al. | 361/749 |
| 4,986,763 | 1/1991 | Boyle | 439/165 |
| 5,253,142 | 10/1993 | Weng | 361/683 X |

Primary Examiner—Michael W. Phillips
Attorney, Agent, or Firm—Lawrence R. Fraley

[57] ABSTRACT

An electronic apparatus (for example, a portable computer) which includes two portions (for example a display and a keyboard) which are connected, electrically, by a flexible cable. The apparatus provides a unique coupling scheme wherein a movable member is used which moves (for example, rotationally) on at least a part of each of the two portions in a manner substantially independent of the motion of such parts. The flexible cable passes through this member (through opposite openings in the sides thereof) and, significantly, engages the member during movement (pivotal) of one/both of the two portions to assist in effecting the member's rotation. Such movement is attained without harm to the cable, while assuring a compact design for the final product incorporating the coupling structure.

6 Claims, 2 Drawing Sheets

ELECTRONIC APPARATUS WITH FLEXIBLE CABLE INTERCONNECT HAVING INDEPENDENTLY MOVABLE MEMBER SUPPORTED ON TAB PORTIONS

This is a continuation of copending application(s) Ser. No. 08/000,441 filed on Jan. 4, 1993.

TECHNICAL FIELD

This invention relates to electronic apparatus and more particularly to electronic apparatus of the information handling system variety, more commonly referred to as computers. Even more particularly, the invention relates to such computers which are of the portable type, including those often referred to as "laptop" computers.

BACKGROUND OF THE INVENTION

Computers, including those of the portable type, have become well known and are currently in widespread usage in this and many foreign countries. The several advantages associated with such electronic apparatus, especially those of the portable type, are well documented and too numerous to mention here. Examples of such portable computers, including those referred to as "laptop" computers, are described and illustrated in U.S. Pat. Nos. 4,852,033 (Saitou), 4,864,523 (Sasaki), 4,959,887 (Gruenberg et al), 4,986,763 (Boyle) and 5,090,913 (Kobayashi). Typically, such portable computers include a base portion or the like in which are housed various electronic components, including, for example, a keyboard structure, which is usually comprised of a number of key switches and at least one printed circuit board having a matrix of electrical contacts arranged in multiple rows and columns corresponding to the keyboard's switches. Also typically included in such a first, base portion is the computer's central processing unit (CPU), a power supply (for example, a battery), and appropriate storage devices such as a floppy or hard disk. As known, portable computers further typically include a second portion which is movably (for example, pivotally) joined to the first, base portion, usually through some form of hinge mechanism. This second portion performs several functions, including, when closed onto the base portion, serving as a cover for same to thereby protect the otherwise exposed key elements of the keyboard, and also as a holder for a display unit which, when open, will be visible to the computer's user. This display unit can be in the form of a video monitor, liquid crystal display, or the like structure.

Understandably, it is necessary to electrically connect various electronic components, e.g., the keyboard and display, with each other in order for the apparatus to properly operate. In the foregoing and similar structures, such interconnection is usually accomplished using some type of electrical cable, including those often referred to in the industry as flexible cable of relatively flat configuration, also referred to occasionally as flexible circuits. Flexible cables of the flat type provide various advantages over known, round coaxial cabling, including, particularly, increased capacity, and are thus becoming more and more desired in today's computer industry. Problems with providing the above interconnections between the described two portions of a portable computer or similar electronic apparatus have occurred due to the relatively high forces at this coupling and the need for proper positioning of the connecting cable, said problems further exacerbated in view of the industry's increasing demand for miniaturization. The result, as evidenced in some of the above patents, has been hinge mechanisms of relatively complex and/or large design in order to accommodate a nearby cable or even to have the cable extend therethrough. For the latter type structures, the result has also typically involved an extensive bending or twisting of the cable in order to "snake" this element through the structure, thereby adding to the difficulty in assembling (and cost) of the final product. Cable failure might also result, particularly in the presence of the aforementioned relatively high forces.

As will be defined herein, the invention provides an electronic apparatus of the type defined above wherein electrical interconnection between the apparatus's two portions is accomplished in a more expeditious manner than those described in structures such as those found in the above listed patents. The resulting design is relatively easy to fabricate and, significantly, necessitates a minimum of cable bending while assuring ease of hinge operation, cable protection and a pleasing aesthetic appearance for the final product. Of further significance, the invention is particularly compact in design, thus satisfying today's demands for miniaturization. Although the term electronic apparatus is particularly used herein to include portable computers, this term should not be limited to such products, as the teachings of the invention may also be applicable to other electronic apparatus such as electronic calculators, typewriters, etc. which utilize at least two electronic component-containing portions coupled by some form of hinge mechanism or the like and wherein electrical interconnection between such portions is necessary. By the terms cabling or cable as used herein are also meant to include electrical cables of round, flat or other cross-sectional configuration, which may be used to provide such interconnections.

It is believed that an electronic apparatus providing the above advantageous features, as well as others discernible from the teachings herein, will constitute a significant advancement in the art.

DISCLOSURE OF THE INVENTION

It is, therefore, a primary object of the present invention to enhance the electronic apparatus art, and particularly that portion of the art involved with portable and the like computers.

It is another object of the invention to provide an electronic apparatus which includes a cable interconnect structure which provides the above, several advantages, as well as others discernible from the teachings herein.

In accordance with one aspect of the invention, there is provided an electronic apparatus which comprises a first portion (for example, a keyboard and associated electronic structure), a second portion (for example, a display unit and associated electronic structure), hinge means which enables pivotal connection between the two portions, a movable member which is movably positioned on at least part (for example, a protruding tab segment) of both portions and a flexible cable which provides electrical interconnection between the electronic components of the two portions. Significantly, the movable member is capable of independent movement relative to the two parts of the defined two portions during pivotal movement of at least one of these portions relative to the other while the interconnecting cable is positioned so as to pass through this member, including during the desired pivotal movement.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
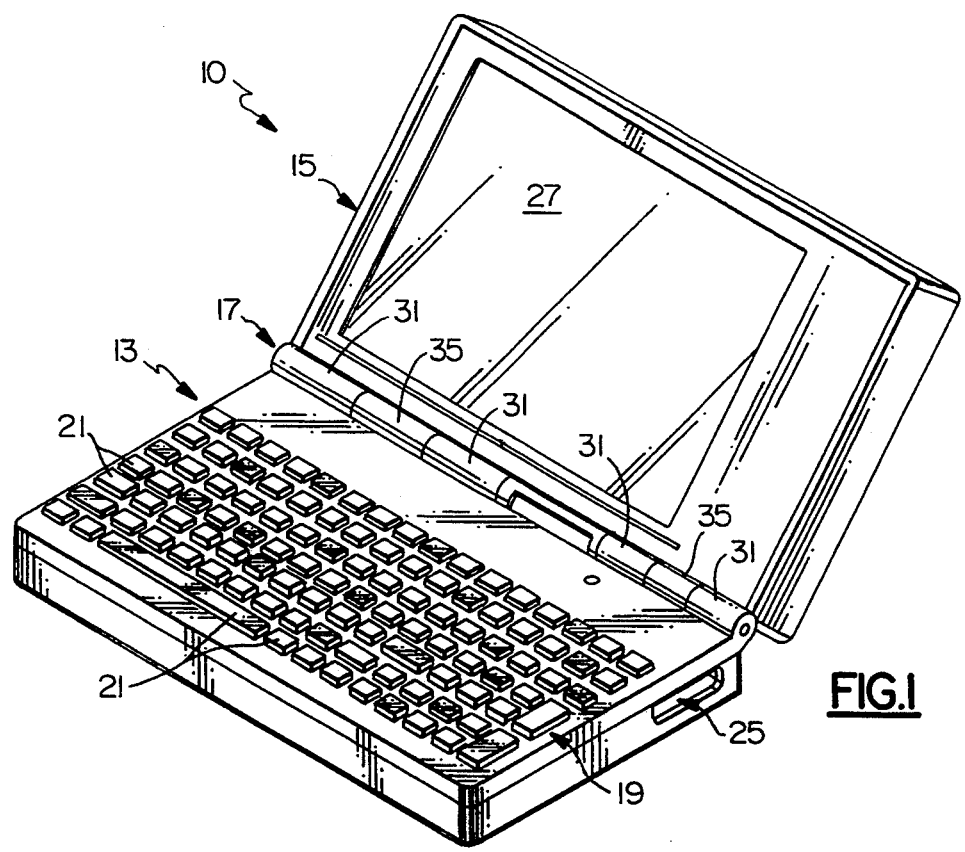
FIG. 1 is a perspective view of an electronic apparatus, as assembled, in accordance with a preferred embodiment of the invention.

In FIG. 1, there is shown an electronic apparatus 10 in accordance with a preferred embodiment of the invention. By the term electronic apparatus as used herein, as stated above, is meant to include information handling system (computer) assemblies and other structures (for example, electronic calculators, calendars and typewriters) wherein two portions are utilized, each having at least one electronic component (for example, a keyboard structure and a display such as a liquid crystal display) positioned therein or thereupon and a hinge means is used to movably couple these two portions. As mentioned, one well known example of such an apparatus is a portable computer. Accordingly, apparatus 10 includes a first (or base) portion 13 and a second portion 15 joined together by a common hinge means 17. First portion 13 includes at least one electronic component 19, which, in the embodiment of FIG. 1, comprises a keyboard structure including a plurality of individual key elements 21 in a defined pattern of rows and columns similar to those of most known computer keyboards. Such a structure includes additional electronic parts (not shown), including for example a printed circuit board and associated key switches as mentioned above. Such parts may comprise those well known in the computer art and further description is thus not believed necessary. First portion 13 also may include therein a CPU, appropriate data storage components (for example, a floppy or hard disk) and appropriate power supply (for example a battery, such as represented by the numeral 23 in FIGS. 3-5). The mentioned CPU and disk components may also comprise components well known in the art and further description is also not believed necessary to define these. First portion 13 may also include at least one slot 25 therein for providing electrical connection to an alternative power source (e.g., conventional line current) in addition to additional slots (not shown) for receipt of appropriate software which may be used with apparatus 10 to thereby increase the operational capabilities thereof.

Figure 4:
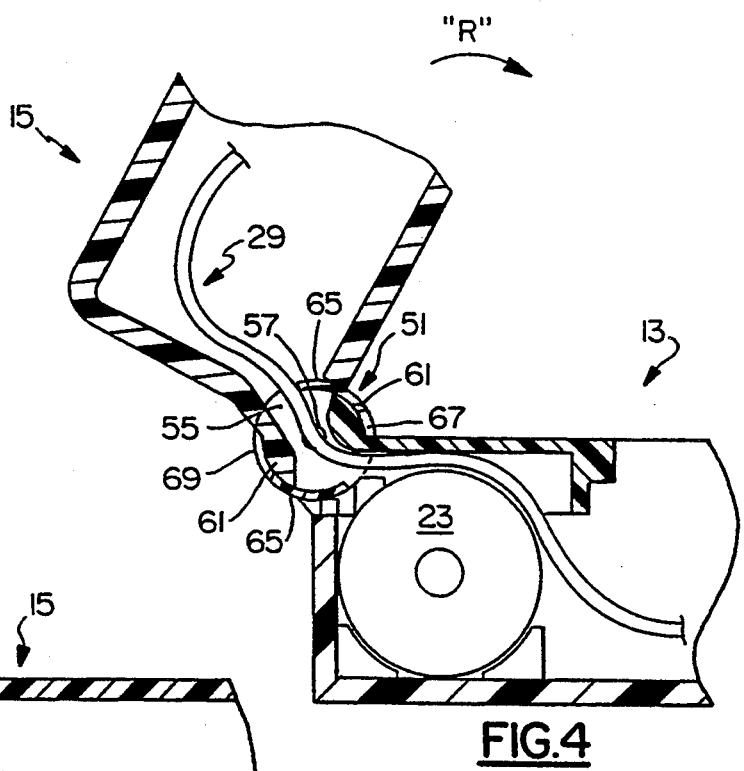
Figure 5:
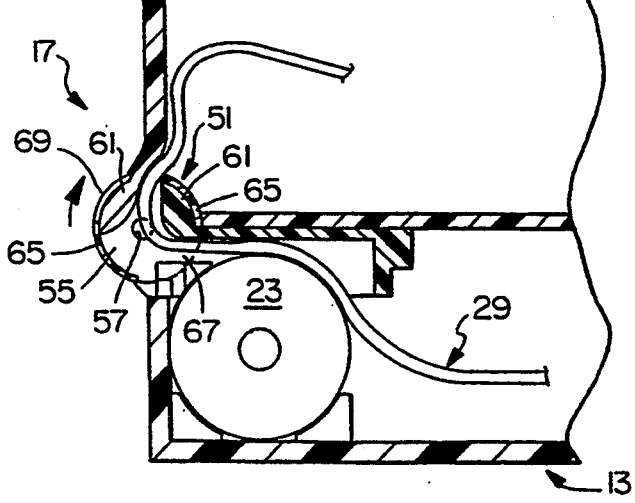

Second portion 15, which is pivotally connected to first portion 13 using hinge means 17 such that portion 15 is able to assume an open position (FIGS. 1-3) of about 130 degrees relative to the substantially planar first portion and thereafter be closed to the position depicted in FIG. 5 so as to cover key elements 21, includes the mentioned display 27 as one electronic component thereof, said display being preferably of the liquid crystal type. Examples of such displays are known in the art and include, typically, a relatively planar screen (shown) which lies substantially flush with the surface of the portion facing the computer's user during operation. Such screens and other parts of such a display are well known in the art and further description is not believed necessary. Display 27 and the defined key elements 21 are not shown in the partial views of FIGS. 3-5 for simplification purposes. Second portion 15 may also include additional electronic parts in addition to the illustrated screen, as known in the art and, again, further description is not considered necessary.

Figure 2:
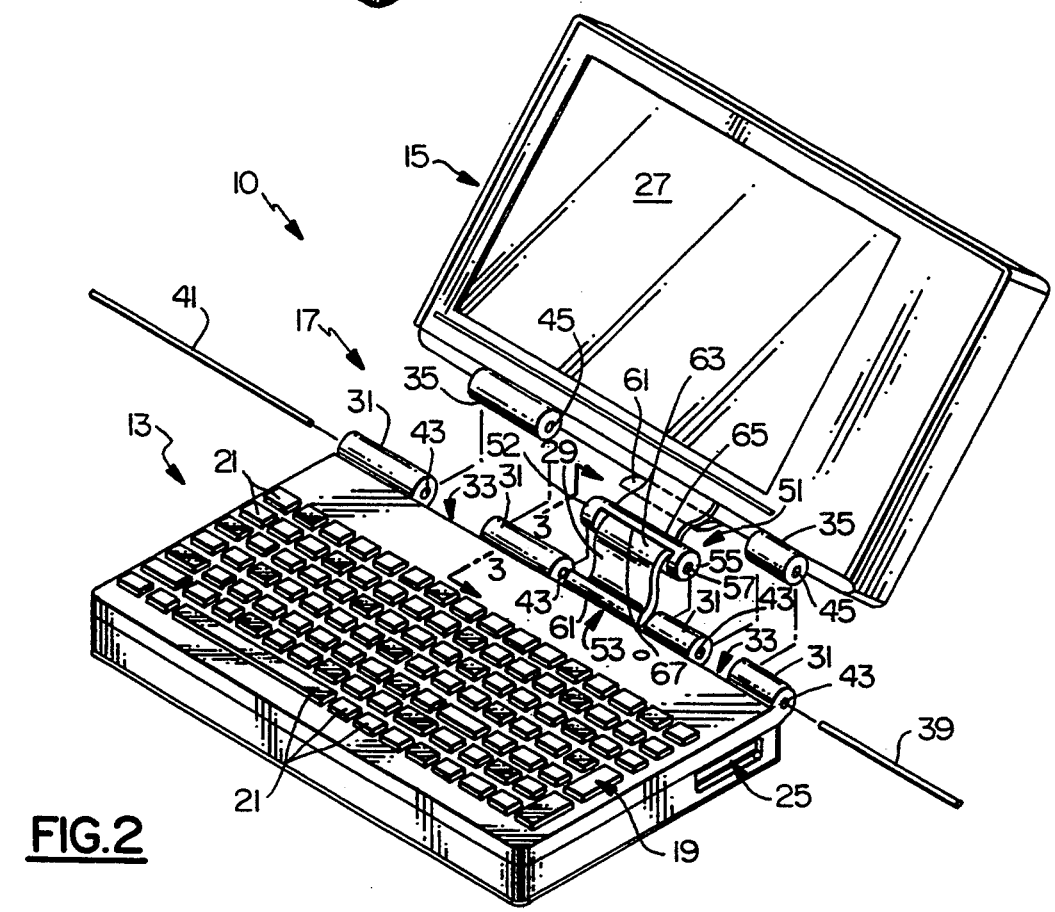
FIG. 2 is a perspective view of the apparatus of FIG. 1, in exploded form and on a slightly enlarged scale over the view of FIG. 1, better illustrating preferred embodiments for both the hinge and interconnecting flexible cable elements for use with the invention and the positioning relationship between said elements.

In FIG. 2, portions 13 and 15 are shown separated a short distance to better illustrate hinge means 17, as well as part of the flexible cable 29 which serves to interconnect, electrically, at least one of the aforementioned electronic components in one portion with at least one other such component in the other portion. Hinge means 17 preferably comprises two pair of spaced cylindrical members 31, each pair spacedly located along one wall or side of base portion 13. Each pair further includes an opening 33 located between the two members 31 of each pair and adapted for receiving a corresponding cylindrical member 35 which is secured to or forms an extension of second portion 15. Likewise, members 31 may form extensions of the base portion or represent separate members which are physically attached thereto. In a preferred embodiment, each hinge member is comprised of plastic material (for example, polycarbonate), as are the outer casings for portions 13 and 15. Members 35 fit relatively loosely within the respective openings 33 so as to rotationally move with respect to the adjacent members 31 in a free manner during opening and closing of portion 15. A pair of pins 39 and 41 are preferably used to hold the aligned members 31 and 35 in position, the pin to the right in FIG. 2 (pin 39) being slidably placed within aligned holes 43 in the right-hand members 31 and an aligned hole 45 in the interim, associated member 35. A similar positioning relationship is provided for the pin to the left in FIG. 2 (pin 41), further description thus not deemed necessary.

Figure 3:
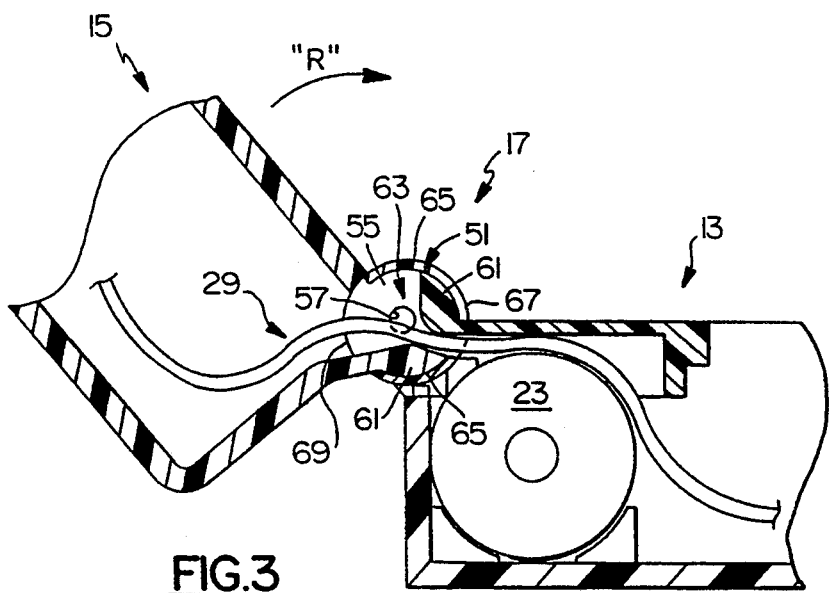
FIGS. 3-5 illustrate, respectively, partial sectional views, on an enlarged scale over the views in FIGS. 1 and 2, of the invention in fully open, partly closed, and fully closed positions, these views clearly illustrating the positioning relationships between the invention's first and second portions, movable member and flexible, interconnecting cable during such positions.

In FIG. 2, as well as in FIGS. 3-5, there is shown a movable member 51 which, as will be understood from the following, is adapted for working in a unique manner in combination with the portions 13 and 15 during movement of either or both of these portions. Member 51 is preferably of cylindrical configuration and is adapted for being positioned within an opening 53 strategically located between the inner members 31 of the invention's hinge means. Significantly, member 51 includes a pair of opposed end sections 55 (only one shown in the sectional views in FIGS. 3-5) each having a hole 57 therein designed to accommodate an end of one of the pins 39 and 41. Member 51 is thus able to move, rotationally, as needed. Member 51, however, is not positioned on or operatively connected to either of the adjacent members 31 and is thus able to move independently with respect thereto. Positioning of member 51 is achieved through provision of protruding tab segments 61, one such segment forming a part of or extending from a respective one of the portions 13 and 15. As shown better in FIGS. 3-5, member 51 includes a hollow central portion 63 with longitudinal sides 65 which function to interconnect the opposed end sections 55. Significantly, the illustrated two sides 65 in turn define a pair of opposed openings 67 and 69 therebetween. As seen in FIGS. 3-5, each segment 61 is designed for being positioned within a respective opening (the segment 61 from base portion 13 extending within opening 67 and the segment 61 from second portion 15 extending within the opposite opening 69) and thereafter engaging an internal surface of a respective one of the longitudinal sides 65. Such segments include curvilinear surfaces which correspond to the internal curvature of the respective sides so as to lie substantially flush thereagainst. Such flush engagement enables the cylindrical member's sides 65 to slidably move over the segment surfaces when desired. Of significance, these sides of member 51, and thus the member itself, are able to move independently of the respective portions 13 and 15 for at least part of the rotational (pivotal) movement (represented by the letter "R" in FIGS. 3 and 4) of these members. This is possible because openings 67 and 69 are larger in width than the corresponding segment 61 extending therein.

In FIG. 3, cylindrical member 51 is shown in position relative to second portion 15 when the second portion is in its fully open position relative to base portion 13. The curved external surface of tab segment 61 of the base 13 is shown as engaging the respective curvilinear internal surface of side 65 (to the top), while other segment 61 engages the corresponding internal surface of opposed (bottom) side 65. Portion 15 is now ready for pivotal movement (about the axis occupied by pins 39 and 41) relative to base 13. Notably, the curved surfaces of the two tab segments are of sufficient size so as to maintain engagement with the respective sides at all times during such pivotal motion as well as during the rotational movement of member 51.

In accordance with the unique teachings of the present invention, flexible cable 29 passes through the cylindrical member 51 from one of the portions (13, 15) to the other, as seen clearly in FIGS. 3-5. Cable 29, preferably a relatively flat member comprised of a dielectric material (for example, polyimide) having a plurality of spaced conductors (for example, copper lines) therein as is common in many of today's flat flexible cables (which cabling is also occasionally referred to as flexible circuitry or the like), enters one of the openings (67) and exits the other (69) and is electrically coupled at the terminal ends thereof (not shown) to a respective electronic component located within one of these portions. It is thus understood from the drawings that these ends form extensions of the cabling which has been cut in the drawings (FIGS. 3-5) for illustration purposes. Cable 29 "snakes" its way through the cylindrical member and, significantly, is thus hidden from view when the invention is fully assembled (FIG. 1). More significantly, the unique arrangement described herein precludes the previous necessity for excessive bending or twisting of cable 29 in order for the cable to properly pass from one portion to the other while still assuring full protection for the cable (for example, from mishandling or exposure during assembly or operation of the invention). As shown herein, cable 29 requires a minimum of such bending and/or twisting, and is substantially fully covered by the invention's other structural parts in the finally assembled product. Perhaps more significantly, and quite surprisingly, the cable 29 also functions to assist in rotation of member 51 and is able to do so without harm to the cable (or to member 51, for that matter). As seen in FIG. 4, with portion 15 pivoted to a partly closed position, cable 29 engages an internal edge of the top side 65 of member 51, which engagement continues during final closure of portion 15 and thus forces member 51 to rotate about the central axis occupied by pins 39 and 41. It is again noted that tab segments 61 remain in physical, sliding contact with the respective internal surfaces of sides 65. At final closure, shown in FIG. 5, member 51 has rotated fully until an edge opposite that engaged by cable 29 has engaged (and abutted against) a respective outer surface of the tab segment of portion 13. It can be clearly seen in FIG. 5 that the cable still has adequate spacing within opening 69 such that damage to the cable does not occur. Further, it can be seen that the opposite opening 67 affords adequate spacing for the other end of cable 29, such that buckling, twisting or bending thereof will not occur, regardless of the degree of pivotal movement of portion 15. Member 51 is also preferably of plastic, a preferred material being polycarbonate (including those polycarbonates of the electrically conductive variety). In one example of the invention, member 51 possessed an overall length of 38 millimeters (mm.), an outer diameter of 7 mm. and an internal diameter (for its central, hollow portion) of 6 mm. Each opening 67 and 69 possessed a length of 30.2 mm. and a corresponding width of 2.3 mm. In this embodiment, cable 29 possessed a thickness of only about 1.5 mm. and a width of about 30 mm. Despite such relatively thinness for such a component, the described rotation of the cylindrical member 51 without harm to the cable was repeatedly possible.

Thus there has been shown and described an electronic apparatus which provides a new and unique cabling system for electrically interconnecting two portions thereof in a safe and effective manner, while still assuring a pleasingly aesthetic appearance for the final product. The connecting structure as defined herein is of relatively simple construction and can be assembled in minimal time and at relatively less cost than many connections structures of the prior art.

While there have been shown and described what are at present considered the preferred embodiments of the invention, it will be obvious to those skilled in the art that various changes and modifications can be made therein without departing from the scope of the invention as defined by the appended claims. For example, it is readily possible to incorporate some ratchet means or the like as part of the invention's hinge means in order to provide incremental movement of the invention's first and/or second portions, while still assuring the several highly advantageous features cited herein. As also stated above, the teachings of the invention are readily adaptable to electronic apparatus other than portable computers such as those referred to occasionally in the art as "laptop" computers. That is, the teachings herein are readily adaptable to a variety of products which utilize two portions requiring electrical interconnection therebetween using some form of electrical cable.

We claim:

1. An electronic apparatus comprising:
   a first portion including at least one electronic component;

a second portion including at least one electronic component, each of said first and second portions including a protruding tab segment;

hinge means pivotally connecting said first and second portions;

a movable member movably positioned on at least part of each of said first and second portions and including first and second openings therein, said movable member movably positioned on said tab segments of said first and second portions and adapted for independent movement with respect to said first and second portions and said hinge means during pivotal movement of at least one of said portions, said movable member being a separate member from said hinge means; and a flexible cable for electrically interconnecting said electronic component of said first portion with said electronic component of said second portion, said flexible cable passing through said first and second openings of said movable member and engaging said movable member during said pivotal movement of said at least one of said portions to effect movement of said movable member.

2. The invention according to claim 1 wherein said electronic apparatus is a portable computer.

3. The electronic apparatus according to claim 2 wherein said electronic component of said first portion comprises a keyboard.

4. The electronic apparatus according to claim 3 wherein said electronic component of said second portion comprises a display.

5. The electronic apparatus according to claim 1 wherein said movable member includes longitudinal sides and is of substantially cylindrical configuration, each of said first and second openings being positioned along a respective one of said longitudinal sides of said movable member.

6. The electronic apparatus according to claim 1 wherein said flexible cable is of substantially flat configuration.

* * * * *